Patented July 5, 1938

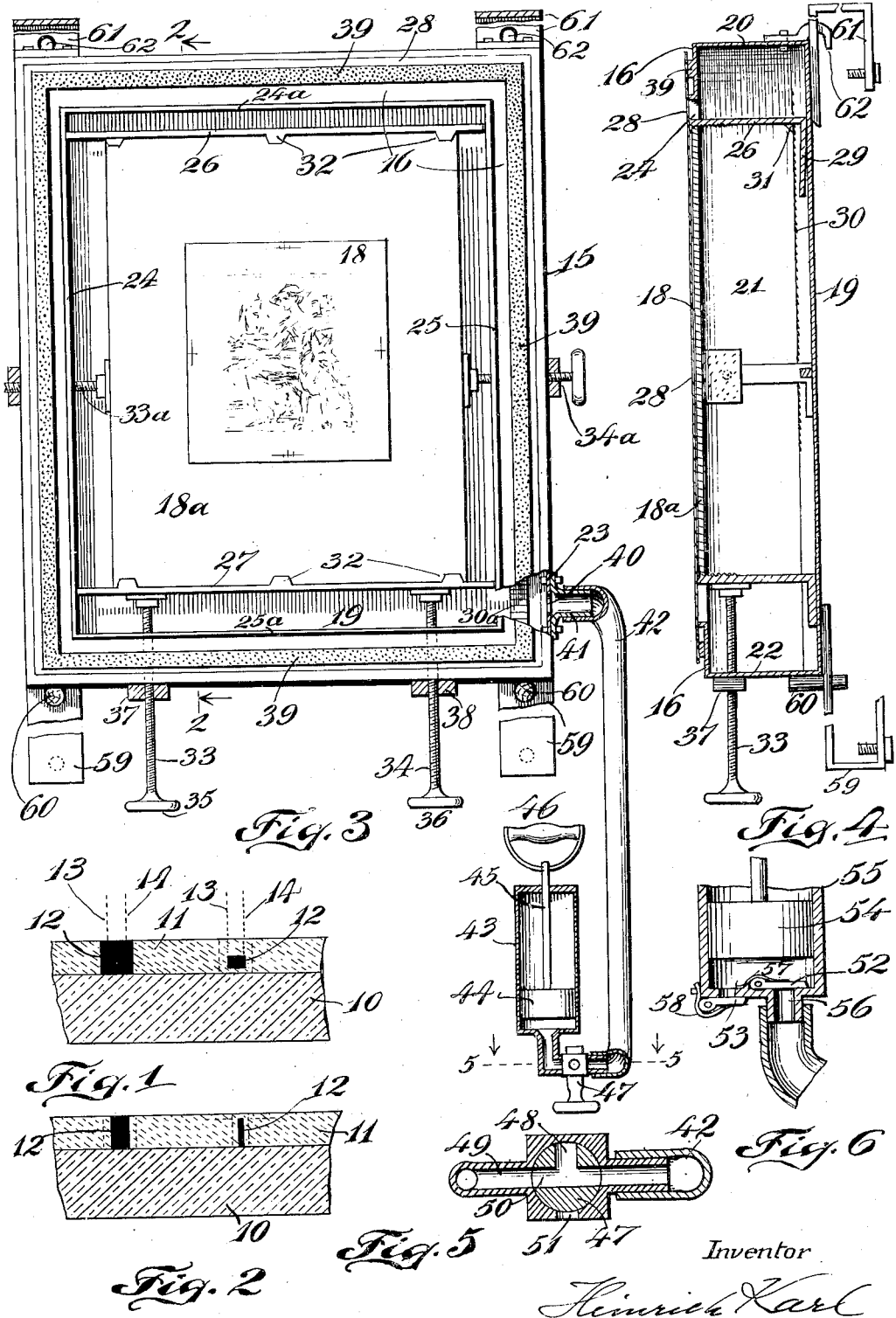

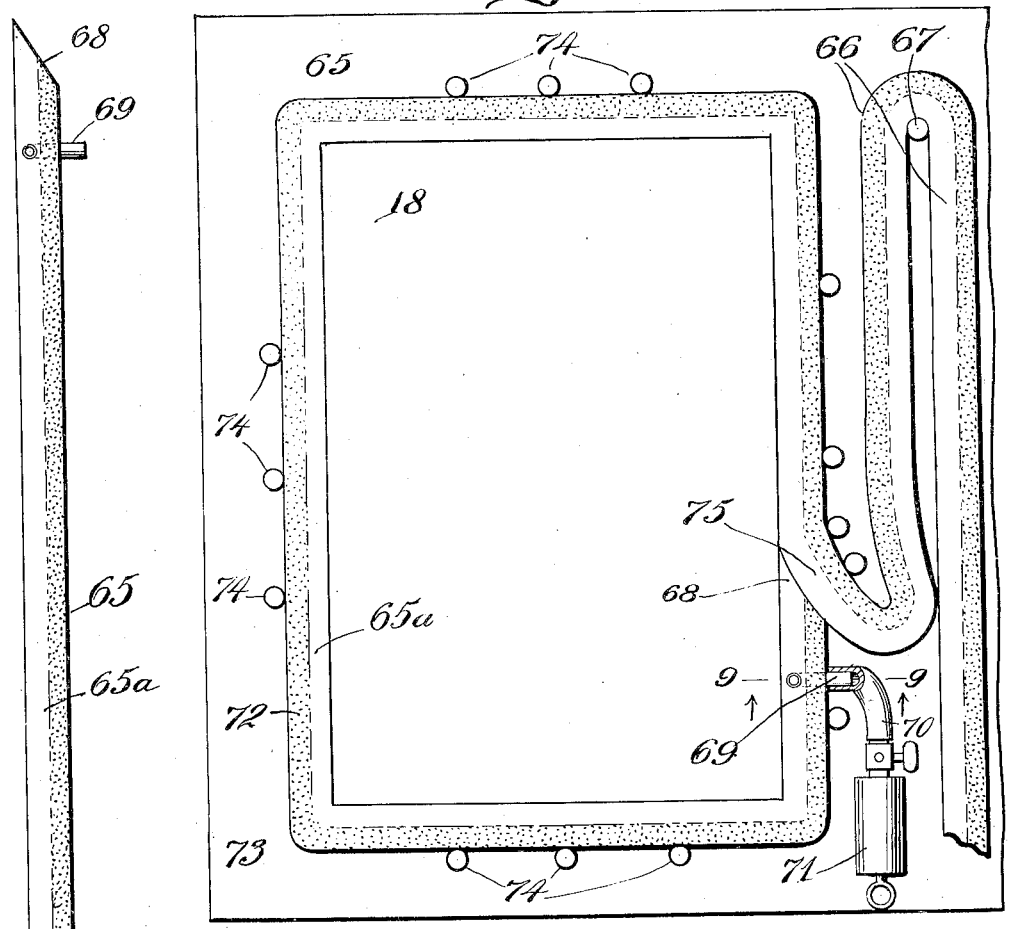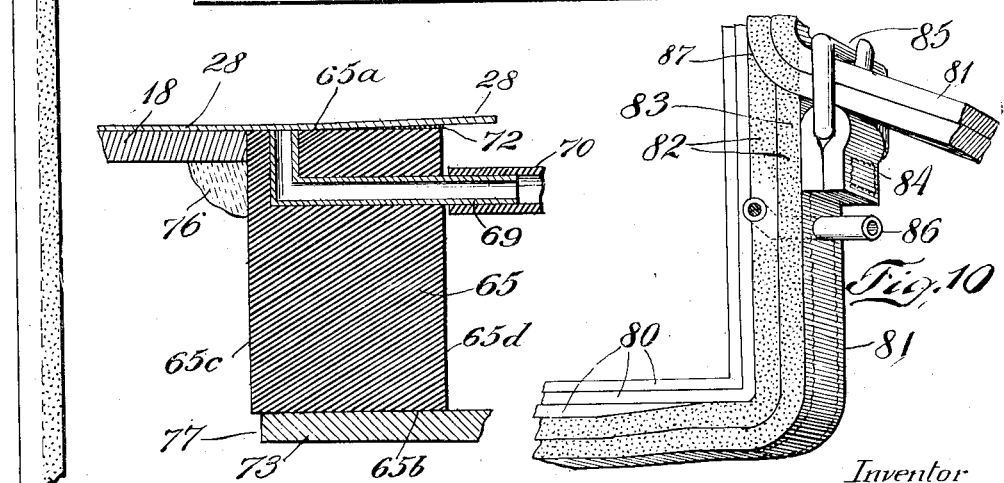

2,122,474

UNITED STATES PATENT OFFICE 2,122,474

DEVICE FOR HOLDING FILMS OR THE LIKE

Heinrich Karl, Jersey City, N. J.

Application November 7, 1933, Serial No. 696,934

16 Claims. (Cl. 248—363)

This invention pertains to frames adapted for holding films or other sheets of air-proof material tight against the original to be reproduced or traced, etc. and it is especially adaptable in the process set forth in my U. S. patent application Serial No. 486,516, entitled "Method of working in the reproducing arts" which was patented on March 20, 1934 and which received the Patent No. 1,951,574.

Although this invention is made purposely for the use described here below, it may find ready use in other lines or trades as, for instance, in connection with the creation of screen or motion pictures or it may render good services to the draftsman, architect or engineer, etc.

In said above mentioned allowed patent application it has been contemplated to use a transparent means, such as a celluloid or gelatine sheet or even glass, to be placed before the original to be reproduced and to have such parts emphasized with white or light color that have to be photographed lighter than they are actually seen on the original and to emphasize with black or dark color those parts that must come stronger than they usually would be on the negative, the positive, respectively. For facsimile reproductions and for fast working I contemplated and claimed the use of said film, etc. to be placed on the original and to cover with white or light color those parts that must come lighter and leave those parts free that must come strong or stronger. There is therefore no drawing with black or dark color to be made on said film (although in some cases it might expedite the work if touches or tints are added) and those parts that must come stronger will be photographed directly from the original. There is therefore no handwork included that is oftentimes so objectionable and we will assume that in connection with this invention only such work is done in which no touches or tints are added.

For securing good work said film must lie closely on the original because the parts of the film painted or blown on with white or light color throw a shadow upon the original and if the film does not lie closely on the original part of that shadow will be seen extending from the borders of the parts that are covered with said white or light color. Said shadows create very undesirable hard edges on the photograph that would be seen on the negative and positive. In order to eliminate this inconvenience I constructed said frame so that the original can be placed therein so that the photo-engraver or the lithographic artist will be enabled thereby to prepare the several films which when finished are to be placed again before the original for being photographed together with the latter whereby the films must be placed in correct register with the marks affixed prior also to the original. The edges of said films are secured to the frame preferably by means of a sticky material, such as pitch, paraffin or wax or by a compound thereof, and the edges must be slightly pressed on in order that no air can penetrate said frame when the film, etc. is put on. Although other known means may be used for affixing a film I prefer the aforesaid manner of holding the film to the original and to the frame. After the film has been thus affixed the air contained in the frame will then be reduced somewhat by means of any suitable air suction apparatus in order that the outside air pressing against the outer surface of said film does not encounter any noticeable resistance by the air still contained inside the frame. The film will then lie snugly on the original and there will not be any shadow visible that is thrown on the original by the white or color painted or blown on the film.

There is also an illustration made to show why reproductions should be made in the method contemplated herewith. Its aim is to show to those whom it may concern that the halftone dot (or any other kind) will retain its uniform shape no matter how fine it has been photographed and despite an additional reduction in size with ferry-cyanide on the negative or positive said dot will not lose its general shape and depth and will withstand the sharp printing light. This is especially necessary for processes that depend upon correct negatives or positives, as, for instance, the so-called deep-etch process in the lithographic reproducing method now acquiring favor on account of the good results in the press. The plates must have a halftone dot that is perfect throughout the picture, if it is not to show that ragged effect that is due to the halftone dots not being black enough and perfect in shape for preventing the sharp light of the arc lamp to pass through them. This process is just as well of advantage to the photoengraving business because it will relieve the photo-engraver from etching his plates more than once and consequently the proofing of them more than once.

In the accompanying drawings which form part of this specification,

Figure 1 shows in enlarged size the section of a fraction of a negative or positive illustrating how the halftone dot in the coating (the emulsion) on top of the glass is affected by ferry-cyanide usually used for reducing the halftone dot, the tint, respectively;

Figure 2 shows how the desired strength of the halftone dot is obtained by the method contemplated in this invention and by the aforesaid now allowed application for patent Serial No. 486,516, whereby there is still the chance left for a further reduction of the halftone dot if desired by means of a solution of ferry-cyanide without the risk of weakening the dot to an extent in which the strong light of the printing lamp will get through.

Figure 3 shows in front elevation the frame with a film in front and with the means for reducing the air inside the frame; some parts are removed to show inside details;

Figure 4 is a section of the frame on the line 2—2 of Figure 1 seen in the direction of the arrows;

Figure 5 is a sectional view on the line 5—5 of Figure 3 and shows a detail, somewhat enlarged, of the air suction device employed in Figure 3; and Figure 6 is a modification of an air suction device shown in section and employable with the device of Figures 3 and 4.

Figure 7 shows a modification of the device of Figure 3 whereby the rubber or partly rubber and leather strip is used for making the frame on which the film, etc. is to stick and whereby the surplus length of the strip is hooked up;

Figure 8 shows the strip of rubber, etc. of Figure 7 when taken from the original shown in Figure 7 and straightened out;

Figure 9 shows a section on the line 9—9 of Figure 7; and

Figure 10 is a fractional perspective view of another modification of the device whereby rubber bands are employed as the inner tightening means and a thickened leather belt for holding the rubber bands tight to the edges of the original and for receiving the sticky mass.

Referring more particularly to Figures 1 and 2, the glass of the negative or positive is indicated by 10, the coating by 11 and the halftone dot by 12. The halftone-dot shown on the left is supposed to be of the size on which no reduction whatsoever has been made. Now we will assume that after the examination of the original the artist in charge decided to reduce this dot, that is, a number of them that form a tint, so that the size of the single dot will be limited on the sides thereof as indicated by the vertical dotted lines 13 and 14. The reducing medium, which usually consists of a solution of ferry-cyanide, bleaches the developed nitrate of silver that constitutes the halftone dot on the outer surface thereof and penetrates further if no counteraction is taken by applying a hypo solution. The ferry-cyanide solution, however, does not reduce the halftone dot on the sides alone as it is mostly believed by those treating such negatives or positives, but the ferry-cyanide solution attacks the halftone dot from all exposed sides and since the uppermost side is the most exposed in this respect it results that the real shape of the halftone dot in its vertical section will be like that shown on the right of Figure 1, that is after the treatment with the ferry-cyanide has reduced its sides to the desired extent indicated by the dotted lines 13, 14. The artist treating the color plates or blacks, etc. wonders why the dots do not print right and why apparently smooth tints on the negative (or positive) appear ragged or do not appear at all on the print. The explanation is simply that the strong light needed for making the printing plate penetrates and directly passes completely through the dot thinned chiefly from above according to Figure 1.

All these inconveniences that doom a job right from beginning or cause endless corrections will be eliminated when that respective halftone dot will be photographed in the right strength by the use of the present invention in unison with the system set forth in my now allowed patent application Serial No. 486,516 that was patented March 20, 1934 and which received the No. 1,951,574. A shorter exposure to the camera obtains a sharper halftone dot as those skilled in the art know. Therefore, those parts on the original that are to be exposed a shorter time than other parts thereof must be covered first with white or with such light color that will give but a very faint dot, that can be detected only with a strong magnifying glass. After the removal of the white or of a light color painted before on the film or after the removal of the film itself another exposure to the camera can be made and according to the figured time a halftone dot of the strength will be obtained as shown on the left of Figure 2, that is, the width of the dot will be that as also indicated in Figure 1 by the dotted lines enumerated 13 and 14. The difference in the real shape of the halftone dot compared with the improper shape of the dot shown on the right of Figure 1 is apparent and a halftone dot obtained as shown on the left of Figure 2 is still adapted for further reduction with a solution of ferry-cyanide without going to the danger of making the dot "gray" or "sick" as it is expressed in the parlance of the trade. Such further reduction is shown on the right of Figure 2 and compared with the halftone dot on the right of Figure 1 it must be admitted that whenever a still further reduction of the last mentioned halftone dot takes place, as for instance for obtaining the same width as the halftone dot on the right of Figure 2, there would be nothing more left of that dot on the right of Figure 1 because the further reduction that acts chiefly on top of the still remaining portion of a halftone dot will make it disappear completely while the already very fine but deep black halftone dot on the right of Figure 2 will still stand more reduction both on top and on the sides and will form the finest dot that is possible without weakening it in the vertical plane to such degree that the strong arc light will go through it.

The importance of working as described in the aforesaid Patent No. 1,951,574 and in this specification is apparent for obtaining good results and for turning out the work fast. As a great help in this respect and as an indispensable means for doing such work there is the frame and accessory means created that are shown in Figures 3 to 6, 7, 8 and 9, inclusive. The main frame of the device of Figures 3 and 4 consists of a square or rectangular hollow body, preferably made of sheet metal or of zinc or of wood and even of strong cardboard, whose front part 16 is to its greatest extent left open as at 17 for receiving the originals or sketches 18, etc., to be reproduced. This body 15 could as well have any other shape suitable for that purpose. It could be round or oval, etc., but since most originals are of the rectangular size I prefer to make the frame 15 accordingly. This frame 15 has a back wall 19 (see also Figure 4) and side walls 20, 21, 22 and 23. The front portion 16 of the frame 15 consists of an equally broad strip extending from the side walls towards the center of the frame. It is advantageous to have frames of various sizes at hand so that small originals and large originals or medium sized originals may be readily put in, preparatory to their reproduction. the depths of the frame may vary also. The various walls of the frame must then be joined in a manner as to become airtight. If metal is used for the frame a suitable solder will hold the various edges sufficiently and make them airtight while glue will be best for woodwork or cardboard. All of the inside edges 24, 25, 24a, 25a or only those indicated by 24, 25 of the side strips of the front portion 16 should be somewhat elevated so as to form a straight edge protruding equally so far to the front of the frame that they will be in alignment with the edges of the original holders 26, 27 that are slidably arranged between them. The film 28 will then lie on these straight edges and will not become wavy at the corners. The original holders 26, 27 are preferably made of metal (especially the former) for exerting a certain pressure through their weight. The upper holder 26 is simply formed as a flat piece having at its extreme inner end downwardly bent extensions 29 that prevent the part 26 from bending over too far to the front. The holder 26 is extended nearly as far as to touch the side walls 21 and 23 and may be moved somewhat to the left or to the right and at the part on which it nearly touches the straight edges 24, 25 it is accordingly cut out so as to permit its up or down movement behind the front walls 16, that is, those that form the side portion thereof that have the straight edges 24, 25. Instead of using a screw attachment as I have shown in connection with the lower holder 27 and on the sides of the frame 15, I simply use two racks 30, 30a and dentate the same so that teeth 31 on the part 26 will catch on the rack 30 and 30a and thereby prevent the holder 26 from falling down, allowing, however, the holder 26 to be lifted and also lowered by holding its front part a little above the horizontal which latter is its normal rest position. The lower surface of the holder 26 may be roughened or provided with small pointed elevations adapted to grip the upper border edge of the original and thus hold it firmly. In a similar manner is the lower holder 27 constructed and according to its purpose it is placed in the position reverse to that of the upper holder 26. In addition the two holders may have small extensions 32 at their extreme front parts and directed downwardly, upwardly, respectively, and therethrough they are adapted to hold the original and limit it from moving too far to the front when it is being placed in the frame and to permit the film 28 to lie on as flat as possible even before the air inside the frame has been thinned. In addition the lower holder 27 not having any functional connection with the rack 30 or 30a is preferably moved up or down by means of screw-threaded spindles 33 and 34 that will have suitable handles 35, 36. The threaded spindles 33, 34 must have such close fitting with stable screw-threads 37, 38 as to form these connections air-proof. In addition a thick lubricant may be used in connection with all the threads. I prefer to employ also a threaded spindle 33a on the left and one 34a on the right side of the frame 15 for adjusting purposes because it may happen that the film 28 poses because it may happen that the film 28 comes out of register with the marks on the original when the air in the frame 15 becomes reduced through the air suction device. In this instance it is simpler to adjust the original instead of moving the film that sticks already on the mass 39 that is the adhesive substance on the frame as will be explained subsequently. On the outer surface of the front portion 16 of the frame there is a layer of a sticky material 39, preferably of paraffin or wax or of a certain grade of pitch or varnish, etc. and this layer is so evened out that the film 28 may lie on evenly and so that it can easily be taken off, as, for instance, for better adjustment with the original 18. I prefer this mode of holding the film 28 to other methods, as, for instance, to tack it on or to compress its edges between two bars by means of screws, etc. because the film can be better adjusted and will form an airtight closure of the front part of the frame.

In one of the side walls, as, for instance, that indicated by 23, (see Figure 3) there is a hole 40 made and a pipe socket 41 suitable for the adjustment of a rubber pipe 42 is fastened airtight to said side wall and in alignment with that hole. To the rubber pipe 42 is connected an air-sucking device of any preferable form, but since the reduction of the air pressure inside the frame does not need to be excessive an air suction device of the more primitive type, such as shown, is preferable. This air suction device is to be operated by hand and consists of the cylinder 43 with piston 44 to which the rod 45 is connected and on the other end of which is fastened the handle 46. At the other end of the cylinder 44 is fastened a valve mechanism whose section is shown in Figure 5. It consists of a two-way valve 47 which when placed in the position of Figure 3 which is also the same as that of Figure 5, establishes communication between the interior of the frame 15 and the interior of the cylinder 43 below the piston 44. It is thus apparent that when the handle 46 is pulled and thereby the piston drawn upward, air from the interior of the frame 15 will be drawn into the cylinder 43 below the piston 44 of the suction device, under the condition that the film 28 is put on the frame 15 and somewhat pressed on the sticky mass 39 by means of a rod or stick or of a straight edge, in order to make also the film 28 in front of the frame 15 an airtight connection thereof. While the piston 44 is left in its uppermost position and the valve 47 is placed so that the passage 48 communicates with the passage 49 which communicates with the interior of the cylinder below the piston 44, the passage 50 will come into alignment with the passage or exhaust port 51 and will let escape the air when it is being expulsed from the cylinder 43 by means of the downward moving piston 44 when the operator pushes the handle 46 down. This procedure may be repeated several times until the air inside the frame 15 has been so thinned that the atmospheric pressure keeps the film 28 completely tight on the surface of the original to be reproduced. It is mentioned that this procedure is even harmless to pastels because there will not be rubbing motions made by the film 28 on the surface of the original.

In the modification shown in Figure 6, the construction is simplified because there is no valve in connection therewith that must be manipulated by the operator. The mechanism is performed by self-opening and self-closing flaps or flap valves 52, 53 that work as follows: When the piston 54 in cylinder 55 is pulled up, flap valve 52 that is preferably hinged to the bottom of the cylinder 55 will be lifted by the air coming from the interior of the frame 15. The valve 53, however, that serves for closing the exhaust port is pressed against that port through the atmospheric pressure which becomes effective through the thinned air in the cylinder 55. At the downward stroke of the piston 54, however, the air in the cylinder below the piston becomes compressed and presses on top of the flap valve 52 forcing the latter to close the port 56 that communicates with the interior of the frame 15 and said compressed air presses also upon the top of the flap valve 53 forcing the latter to open the exhaust port whereby the compressed air in the cylinder 55 below the piston 54 can escape. Weak springs 57, 58 may be employed for helping the closing of the flap valves 52, 53, respectively. It is assumed that from the foregoing detail and general description the function of the apparatus will be well understood and it is only to add that the most suitable films for turning out good work would be those that are used in the film industry, besides that cellophane or so-called colloloid, if not too thin, would be of good service and suitable for the frame. There are also fastening means 61 provided for hanging the frame 15 on the hooks 62. The fastening means 61 may be hooked on the board and screwed thereon. A similar device 59 on the bottom of the board may serve to hold the frame 15 from below by means of bolts or screws 60 or the like means.

It is still to mention how the work will proceed. The original will be given to the lithographic artist or photo-engraver and he will put the same into the frame 15, and will adjust the holders 26, 27 (the latter by means of the screw-threaded spindles 33, 34) to hold the original fast. If the original is small it may be pasted or tacked to a larger cardboard (see Figure 3 where the original 18 is pasted to a cardboard 18a).

If it is a four-color job, the lithographic artist or photo-engraver takes at least four films, puts one on the frame thus covering the original and affixes the film on the sticky mass 39 and reduces the air inside the frame as explained. Then he proceeds with covering with white the parts that must come light in the first color, say the "yellow", after he has pulled the cross-marks, etc. that correspond correctly with those pasted on the original or on the cardboard 18a. It may be necessary to use several films for obtaining the desired effect especially in the red, blue and black. In the same way the artist proceeds with putting on the other films one after another, covering with white the parts that have to come lighter and to leave those parts free that must come strong whereby those parts may be covered with rubber cement that must be left free from white whereafter the dried rubber cement must be lifted from the film after the white is blown on. When all the colors are thus prepared on the films, the photographer receives the frame 15, preferably with the original still contained therein hooks that frame 15 on the board, etc., places the films in exact register with the marks and reduces the air inside the frame every time a new film has been put on and exposes the original with the film placed on as long as indicated by the artist. There may be a general shorter or longer exposure without the film, but this all depends upon the nature of the original and of many other circumstances. In the meantime the artist, etc. may have to take other frames 15 and place other originals or sketches, etc. into same and proceed in the aforesaid method. The photographer, however may have his own frames 15 so that the frames 15 used by the artist do not need to be used also by the photographer. The films, after being photographed in connection with the original, can be washed off and used again in connection with other originals.

In some respects the frame 15 of Figure 3 is not so suitable as the simplified frames shown by the modifications of Figures 7, 8, 9 and 10 especially when the originals differ so in size that frames 15 of various sizes would be necessary to suit best for working purposes.

In order to simplify the whole method and to create, so to say, a simple means that is adapted to make a suitable frame for the film and to allow the thinning of the air between the film and the original whereby any of the usual sizes of originals may have said means applied to, consists of the flexible rubber strap of Figures 7, 8 and 9 or of the combination of rubber bands and of a leather strap or belt shown by Figure 10. Referring more particularly to the rubber strap 65 of Figures 7, 8 and 9, the whole strap may be made of a somewhat soft kind of rubber that snugly lays on the edges of the original 18 or of the cardboard to which is pasted or tacked the original. This rubber strap should have such length that suffices for surrounding also large sketches or originals and in Figure 7 it is shown that the part being of surplus length that is indicated by 66 is simply hung up on a hook 67. For obtaining a close fitting at the meeting parts of the strap the end 68 is cut or formed into a very sharp angle. Conveniently distanced from that end part 68 there is the elbowed pipe 69 inserted into the strap. The pipe 69 is preferably made of metal and one end thereof is flush with the upper surface of the strap 65 and situated near the interior edge of the strap while the other open end protrudes over the outer side of said strap 65. A pipe 70, similar to pipe 42, is secured with one of its ends to the extended portion of pipe 69 and the other end to the relatively small air-suction device 71 whose construction may be of the character shown in Figures 3, 5 or 6. On the upper surface 65a (see Fig. 9) that is to come in alignment and which must be flush with the original 18, there is the sticky mass 72 put on and so distributed that the opening of pipe 69 and a part surrounding it, especially in the direction towards the original 18, is left free so that the air underneath the film 28 can reach the opening of pipe 69 and consequently will be sucked up by the air-suction device. The under side 65b inner side 65c and the outer side 65d of the strap 65 are preferably flat and the strap should be of such depth and thickness that it will be capable of holding the sides of the original without twisting although the original may be thin; instead of the original it may be only a cardboard holding the original that is to be held airtight. If the original is mounted on a frame, as most canvases are that are painted or drawn on, such frame may be deeper than the strap 65 and this circumstance would not interfere with the correct functioning of the device. In most cases, however, especially where the thickness of the original permits it it is of advantage to use a cardboard 73 of suitable strength on which the strap 65 is to repose whereby bolts or nails 74 are inserted in the cardboard 73 for holding the strap 65 close to the original 18 (or card board edges) especially on such parts on which the said strap 65 usually tends to separate itself somewhat from the edges of the original. These parts of the edges are usually those situated about the middle between two corners. The bolts or nails 74 will then keep the strap close to the border of the original whereby it will be held to the cardboard, etc. 73, that forms the base. It is also contemplated to make the strap 65 of two different kinds of rubber, namely, by using a soft kind for the part that forms the interior side 65c (see Figure 9) and by taking a somewhat tougher rubber or leather for the outer part that forms the exterior side 65d. In connection with the device of Figures 7, 8 and 9 it is not absolutely necessary to have the sticky mass 72 put in advance to the whole strap and it suffices that said mass be applied only on that part of the strap that actually surrounds the original. In this instance there must be covered simultaneously the short gap 75 with sticky mass, which gap had otherwise to be covered separately with sticky mass, as, in the example of Figures 7 and 8 in which the strap 65 has previously received the layer of sticky mass 72. As an additional precaution for preventing the entering of air when the strap is put around the borders of the original and the film 28, etc. is placed on the original and on top of the strap 65, on the sticky mass 72, respectively, there may be some wax 76 put to the corner that is formed by the underside of the original 18 and by the side 65c of the rubber strap 65. It is obvious that this device may be used with originals that have border edges of all the usual shapes, as for instance oval, round, square, rectangular and may others. In case in which the edge of the original 18 should be of greater thickness (or depth) than the strap 65 it will then be necessary to cut the cardboard 73 out as indicated at 77 in Figure 9.

Referring now to Figure 10, this device belongs to the same category as that of Figures 7, 8 and 9 because it can be used also for originals of various different sizes and shapes of their border edges. The first means that is to be placed close to the edge of the original is the soft rubber band 80 which may be of considerable length and which may be laid on by several convolutions around the edges of the original so as to form several layers thereon. Around this rubber band frame will be strapped the leather belt 81 which will hold the rubber band layer or layers 80 firm against the edges of the original. The leather belt 81 may be formed by two or more leather strips sewn together as shown in Figure 10, chiefly for the purpose to create a broad enough margin 82 that is to be covered with the sticky mass that is of the same character and which has the same purpose as that indicated by 39 in Figure 3 and by 72 in Figure 7. At the end 83 of the leather belt 81 there in an additional and folded leather piece 84 sewn on the outer side of the strap 81 and this additional folded leather piece 84 holds the usual buckle 85. The leather belt 81 must have the holes as employed with leather straps. A little distance from the buckled end 83 there is the elbowed pipe 86 so inserted in the strap that it will be positioned and function similarly as the pipe 69 of Figures 7, 8 and 9. With the rubber pipe 70 and with the air-suction device 71 (Figure 7) adjusted thereto and the film 28 (Figure 3) placed thereon the outfit will then be complete and represents a great simplification compared with the modification of Figures 3 and 4. If the belt 81 is strapped tightly enough there will be an airtight frame created after an eventual gap 87 has been closed with a piece of wax. The film, etc. 28 may be affixed also with thumb-tacks, etc., besides the sticky mass that is to be employed for making the joints between the film and the leather-strap airtight.

I have herewith fully described a preferable form of my invention and the method of working with it but I am aware that many details are susceptible to change or modification without departing from the broad spirit and scope of the invention.

What I claim is:

1. In a device for holding films close to an original or copy and thereby permitting the free working by hand on said films, of a hollow body with two large sides open to a large extent on one of its two large sides and a means on the borders of that open side adapted for holding a film in such manner as to render said hollow body airtight to the air outside thereof, and an air suction device connected to said hollow body and adapted to reduce the air in the latter and thereby press said film against the front side of said original or copy through the atmospheric air pressure.

2. In a device for holding films close to the front-surface of an original, permitting thereby the working by hand on said films, of a flat-shaped hollow body with one of the larger sides, the front side, open to a large extent, means for holding an original that is executed on any of the common materials, such as, canvas, cardboard, paper, within said open part of said front side and a means for holding a film in such manner as to enclose said original in said hollowed body and prevent air from entering therein and a means for thinning the air between said original and said film so as to press said film close against said original through the atmospheric air-pressure.

3. In a device for holding films close to an original or copy through the atmospheric air-pressure by thinning the air between said original and said films, permitting thereby the free working by hand on said films, of a hollow body with two large sides, one, the front side, open to a large extent for receiving an original, a film for being placed on said original and extending in side over the open part and still farther on the front side, a frame-like extension on the front side of said hollow body forming the part surrounding said open part and a sticky substance applied evenly on the outer surface of said frame-like extention adapted to hold said film when the latter is pressed thereon.

4. In a device for holding films close to an original or copy, through the atmospheric air-pressure by thinning the air between said original and said films and permitting thereby the free working by hand on said films, of a flat-shaped hollow body, one of the two large sides thereof open to a suitable extent, a frame-like extension of said hollow body surrounding the part left open in front thereof and the edges of said frame-like extension elevated towards the front for straightening the film that is to be put on.

5. In a device for holding films close to an original or copy, through the atmospheric air-pressure by thinning the air between said original and said films and thereby permitting the free working by hand on said films, of a hollow body having one side open to a large extent and adapted to receive an original copy, means for holding said copy and a film for covering said copy and means for holding said film airtight against the hollow body thus enclosing the original copy in said hollow body, and means extending outside of said hollow body for adjusting said original copy in registry with said film.

6. In a device for holding films close to an original or copy, through the atmospheric air-pressure by thinning the air between said original and said films and thereby permitting the free working by hand on said films, of a hollow body having one side partially open, adjustable means for holding an original in said opening and a board adapted to be held by said means, said board adapted for holding originals and sketches and copies of all kinds and adapted to be covered by one of said films for enclosing said board with said originals, sketches and copies in said hollow body and for separating them from the air outside said hollow body.

7. In a device for holding films close to an original or copy through the atmospheric air pressure by thinning the air between said original and said films, thereby permitting the free working by hand on said films, a hollow body having one side partially open and adapted to hold an original in said opening by means of adjustable holding means, said hollow body adapted to be placed on an easel and on a table to permit the artist to work on the film that is to cover said original, and means for securing said hollow body in front of the photographic camera for the photographing of said film and said original.

8. In a device for holding films close to an original or copy through the atmospheric air-pressure by thinning the air between said original and said films, permitting also the free working by hand on said films, of a hollow device forming a frame-like part in its front thereof and having the edges uniformly elevated towards the front, adjustable holding means for the original to be reproduced, said holding means edged so as to be in alignment with the elevated edges of said frame-like part and adapted to keep the film, to be laid over said edges, to lay on flat on the original on account of the equally far outward protruding edges of said frame-like part and of said holding means.

9. In a device for holding films close to an original or copy through the atmospheric air-pressure by thinning the air between said original and said films permitting also the free working by hand on said films, of a hollow device open in its front to a large extent and holding means situated within said device and consisting of the upper, lower and of side holding and adjusting parts for the original, said upper holding part having hooks and toothed racks arranged to permit said hooks to hook in on said racks, said upper holding part having extensions adapted to prevent said upper holding part from bending over too much on the front, said upper holding part shaped and weighed so that it can be freely moved up and down by holding it slightly above the horizontal plane thereof, the lower and the side holding and adjusting parts provided with threaded spindles that extend to the outside of the hollow body and having handles for their ready manipulation and screw-threads for the threaded spindles incorporated with the hollow body.

10. In a device for holding a film close to the original by means of the atmospheric air pressure and to permit to work freely on said film, a strip of flexible material adapted to be laid around the edges of an original or of a means holding the same and to make an airtight closure between itself and the edges of said original or of said means holding said original, said strip of flexible material having a surface adapted to receive a sticky mass and a film material to be held by said sticky mass, and means for thinning the air between the film and said original.

11. In a device for holding a film close to the original by means of the atmospheric air pressure and to permit to work freely on that film, a rubber strip of relative softness adapted to be laid around the edges of an original which can have any of the conventional shapes and sizes such as square, rectangular, round, oval and of more sides, another flexible means adapted to compress said rubber strip and having a side adapted to receive a sticky mass, and a film to be held by said sticky mass, and means for thinning the air between said film and the original.

12. In a device for holding a film close to the original by means of the atmospheric air pressure and to permit to work freely on that film, a rubber strip of relative softness adapted to be laid around the edges of an original holding means, said rubber strip adapted to be compressed so as to make an airtight closure between said edges and itself, a leather strap of certain thickness having a side adapted to receive a sticky mass, a film covering said original and to stick to said sticky mass and an air-suction device for thinning the air between said film and the original holding means, said leather strap having an additional bent leather piece holding a buckle and the end of said strap on which said additional bent leather piece is secured being formed in a sharp angle to which will lie on the part of the strap that is to be locked by said buckle, and an elbowed pipe in said leather strap.

13. In a device for holding films touching-close to the copy to be covered by them and permitting thereby the free working on every film whereby the copy or the means to which the film is attached may have any thickness, a means surrounding the copy and having a foremost edge that is extended in an equal plane, means for holding said copy so that the front surface of said copy is in the same plane as said foremost edge so that said films will lie flat against said foremost edge as well as on the surface of said copy, a sticky substance on said foremost edge for holding said film airtight against that foremost edge and for preventing air to enter between the film and the copy, a channel in said first named means and said channel connected with an air-suction device for reducing the air between said film and said copy.

14. In a device for holding films touching-close to the copy to be covered by them one after another and permitting thereby the free working by hand on the exterior side of these films, a means surrounding the copy, that may have any size in depth said means adapted to surround copies of various sizes and shapes of their edges and various sizes of depths, said means having a protruding flat part that is extended in an equal plane, means for holding said copy so that the front surface of said copy is in the same plane as that of said protruding flat part, a sticky substance on said protruding flat part for holding the films airtight against said protruding flat part and means for causing the atmospheric air-pressure to force the films to lie close on the front surface of the copy.

15. In a device for holding films touching-close to the copy to be covered by them and permitting thereby the free working by hand on the exterior side of the films, a means adapted to surround the copy and softly but tightly press against the edges of said copy that might have any size in depth, said means having a foremost flat part that permits any of said films to be sticked on and said film to lie also flat on the front side of said copy thereby rendering the space left between the copy and said film non-communicating with the atmospheric air.

16. In a device for holding films touching-close to the copy to be covered by them permitting thereby the free working by hand on said films, a means adapted to hold the copy that might have any of the conventional shapes and any size in depth, said means having an edge and being extendable so that it will be adapted to hold copies of various sizes and having a flat side starting from said edge, means for holding the front side of said copy in the same plane as said flat side, the single film secured on said flat side but lying loose on the frontside of said copy.

HEINRICH KARL.